(12) United States Patent
Ledieu

(10) Patent No.: US 12,431,760 B2
(45) Date of Patent: Sep. 30, 2025

(54) ROTOR FOR AN ELECTRIC MOTOR INCORPORATING SOUND ABSORPTION ELEMENTS

(71) Applicant: NOVARES FRANCE, Clamart (FR)

(72) Inventor: Cédric Ledieu, Mont Saint Eloi (FR)

(73) Assignee: NOVARES FRANCE, Clamart (FR)

( * ) Notice: Subject to any disclaimer, the term of this patent is extended or adjusted under 35 U.S.C. 154(b) by 195 days.

(21) Appl. No.: 17/907,296

(22) PCT Filed: Mar. 4, 2021

(86) PCT No.: PCT/FR2021/050374
§ 371 (c)(1),
(2) Date: Sep. 26, 2022

(87) PCT Pub. No.: WO2021/191518
PCT Pub. Date: Sep. 30, 2021

(65) Prior Publication Data
US 2023/0353011 A1  Nov. 2, 2023

(30) Foreign Application Priority Data

Mar. 25, 2020 (FR) ........................................ 2002933

(51) Int. Cl.
*H02K 5/24* (2006.01)
*H02K 1/276* (2022.01)

(52) U.S. Cl.
CPC ............... *H02K 5/24* (2013.01); *H02K 1/276* (2013.01)

(58) Field of Classification Search
CPC ............ H02K 5/24; H02K 1/27; H02K 1/276; H02K 1/2753; H02K 1/274; H02K 1/2706; H02K 1/272
See application file for complete search history.

(56) References Cited

U.S. PATENT DOCUMENTS 4,617,484 A * 10/1986 Buijsen ................. H02K 1/2791
310/67 R
5,581,140 A * 12/1996 Futami .................... H02K 15/03
310/156.53

(Continued)

FOREIGN PATENT DOCUMENTS

CN          110671436 A        1/2020
CN          111193337 A  *     5/2020

(Continued)

OTHER PUBLICATIONS

International Search Report issued Apr. 20, 2021 re: Application No. PCT/FR2021/050374; pp. 1-2; citing: EP 2696470 A2, JP H0775269 A, US 20160365779 A1 and US 20120206007 A1.

*Primary Examiner* — Edgardo San Martin
(74) *Attorney, Agent, or Firm* — CANTOR COLBURN LLP

(57) ABSTRACT

A rotor for an electric motor includes: a rotor shaft rotatably mounted about an axis; a lamination stack coaxially mounted on the rotor shaft, with the lamination stack having first and second internal cavities and permanent magnets are housed inside the first internal cavities of the lamination stack. The rotor further includes a front flange and a rear flange coaxially mounted on the rotor shaft and axially arranged on either side of the lamination stack; wherein at least two of the second internal cavities each house at least one sound absorption element. The at least one sound absorption element is adapted to attenuate the vibrations and/or the mechanical and/or magnetic noises generated by the rotor during its operation within the electric motor.

9 Claims, 4 Drawing Sheets

(56) References Cited

U.S. PATENT DOCUMENTS

| | | | | |
|---|---|---|---|---|
| 5,679,995 | A | * | 10/1997 | Nagate .................... H02K 29/12 |
| | | | | 310/156.45 |
| 5,811,904 | A | * | 9/1998 | Tajima .................... H02K 1/276 |
| | | | | 310/214 |
| 6,329,734 | B1 | * | 12/2001 | Takahashi ................. H02K 1/32 |
| | | | | 310/156.56 |
| 6,445,100 | B2 | * | 9/2002 | Tajima .................... H02K 1/276 |
| | | | | 310/156.21 |
| 6,512,317 | B2 | * | 1/2003 | Lai ........................ H02K 1/276 |
| | | | | 310/156.56 |
| 7,479,723 | B2 | * | 1/2009 | Dawsey ................ H02K 1/2766 |
| | | | | 310/91 |
| 8,677,606 | B2 | * | 3/2014 | Desiron .................. H02K 15/03 |
| | | | | 310/156.01 |
| 10,491,088 | B2 | * | 11/2019 | Tamura .................... H02K 1/276 |
| 2012/0206007 | A1 | | 8/2012 | Kitagawa et al. |
| 2016/0365779 | A1 | | 12/2016 | Watanabe et al. |

FOREIGN PATENT DOCUMENTS

| | | | | |
|---|---|---|---|---|
| CN | 112383164 A | * | 2/2021 | ............. H02K 1/276 |
| DE | 4216489 C2 | | 10/1996 | |
| EP | 2696470 A2 | | 2/2014 | |
| JP | H0686485 A | * | 3/1994 | |
| JP | H0775269 A | | 3/1995 | |
| JP | 3233529 B2 | | 11/2001 | |
| JP | 2012253885 A | | 12/2012 | |
| JP | 2019103366 A | | 6/2019 | |
| KR | 20090011904 U | * | 11/2009 | |

* cited by examiner

ROTOR FOR AN ELECTRIC MOTOR INCORPORATING SOUND ABSORPTION ELEMENTS

TECHNICAL FIELD

The disclosure concerns a rotor for an electric motor. The disclosure also concerns an electric motor comprising such a rotor.

BACKGROUND

In general, current electric motors include a rotor secured to a shaft and a stator which surrounds the rotor. The stator is mounted in a casing which includes bearings for the rotational mounting of the shaft. The rotor includes a body formed by a bundle of laminations or polar wheels (claw pole) held in the form of a stack by means of a suitable fastening system. The body of the rotor includes internal cavities housing permanent magnets. The stator includes a body consisting of a bundle of laminations forming a crown, the inner face of which is provided with teeth delimiting two by two a plurality of slots open towards the inside of the stator body and intended to receive phase windings. These phase windings pass through the slots of the stator body and form winding heads projecting on either side from the stator body. The phase windings may for example consist of a plurality of U-shaped conductor segments, the free ends of two adjacent segments being connected to one another by welding.

In the rotor, the lamination stack is axially clamped between a front flange and a rear flange which are mounted coaxially with the shaft. Each flange generally has the shape of a disc extending in a radial plane perpendicular to the axis of the shaft. Each flange includes a central orifice for the coaxial mounting on the shaft and several through holes intended to receive fastening screws passing axially through the entire lamination stack, said screws being secured to the flanges by means of nuts. The front and rear flanges are generally formed of a non-magnetic, heat-conducting material, for example a metal.

The casing generally includes front and rear bearings assembled together. The bearings define an internal cavity in which the rotor and stator are housed. Each of the bearings centrally carries a ball bearing for the rotational mounting of the shaft of the rotor.

During operation, electric motors often generate noises that might be annoying for people in the vicinity. These noises can be of a mechanical type and result from impacts or frictions between the mechanical parts during the rotation of the rotor. They can also be of a magnetic type and be generated by the magnetic forces produced by the currents flowing through the electric motor. Indeed, these magnetic forces can vibrate the structure of the electric motor at audio frequencies (from 20 Hz to 20 kHz), and these vibrations are transmitted to ambient air by the structure, generating noise.

To reduce the noise pollution generated by electric motors, the currently considered solutions generally consist in optimizing the design or the constituent material of the mechanical parts used in the motor so as to limit the mechanical noises. However, these solutions do not allow reducing the magnetic noises.

SUMMARY

Hence, one amongst the advantages of the disclosure is to suggest a solution to the problem of noise pollution generated by the electric motors as previously described, and, in particular, to suggest a solution allowing reducing both mechanical noises and magnetic noises.

To this end, the disclosure concerns a rotor for an electric motor comprising:
- a rotor shaft rotatably mounted about an axis;
- a lamination stack coaxially mounted on the rotor shaft, said lamination stack comprising a plurality of first internal cavities and of second internal cavities;
- a plurality of permanent magnets housed inside the first internal cavities of the lamination stack;
- a front flange and a rear flange coaxially mounted on the rotor shaft and axially arranged on either side of the lamination stack;
- wherein at least two of the second internal cavities each house at least one sound absorption element, said at least one sound absorption element being adapted to attenuate the vibrations and/or the mechanical and/or magnetic noises generated by the rotor during its operation within the electric motor.

Configured in this manner, the rotor of the disclosure will allow reducing the noise pollution generated during its operation. In particular, the vibrations and/or the mechanical and/or magnetic noises generated by the rotor will be absorbed by the sound absorption elements housed inside the second internal cavities of the lamination stack.

According to other variants, the rotor of the disclosure may include one or several of the following optional features considered alone or in combination:
- said at least two second internal cavities are disposed symmetrically with respect to the axis.
- at least four second internal cavities each house at least one sound absorption element, said at least four second internal cavities being regularly spaced about the axis.
- all of the second internal cavities each house at least one sound absorption element.
- the or each sound absorption element has a shape complementary to that of the second internal cavity in which it is housed.
- the or each sound absorption element consists of a material selected from a silicone material, a mineral polyurethane, a polyurethane-based foam, and a polyamide-based foam.
- each second internal cavity is axially through and has a ring portion-shaped section.
- each second internal cavity is axially through and has a triangular or rectangular-shaped section.
- the or each sound absorption element is secured to one of the front or rear flanges, said sound absorption element may be in particular over-molded, or welded, or glued, or clipped to said front or rear flange.
- the or each sound absorption element is independent of the front and rear flanges and is held in position on each side by said front and rear flanges when said front and rear flanges are assembled to one another.

According to another aspect, the disclosure also concerns an electric motor comprising a rotor as previously defined.

BRIEF DESCRIPTION OF THE DRAWINGS

The disclosure will be better understood upon reading the following non-limiting description, made with reference to the appended figures.

DETAILED DESCRIPTION OF THE DRAWINGS

Throughout the entire description and in the claims, the terms "axial" and "radial" and their derivatives are defined with respect to the axis of rotation of the rotor. Thus, an axial orientation relates to an orientation parallel to the axis of rotation of the rotor and a radial orientation relates to an orientation perpendicular to the axis of rotation of the rotor. Moreover, by convention, the terms "front" and "rear" refer to separate positions along the axis of rotation of the rotor. In particular, the "front" end of the shaft of the rotor corresponds to the shaft end on which a pulley, a pinion, a spline intended to transmit the rotational movement of the rotor to any other similar movement transmission device can be fastened.

Figure 1:
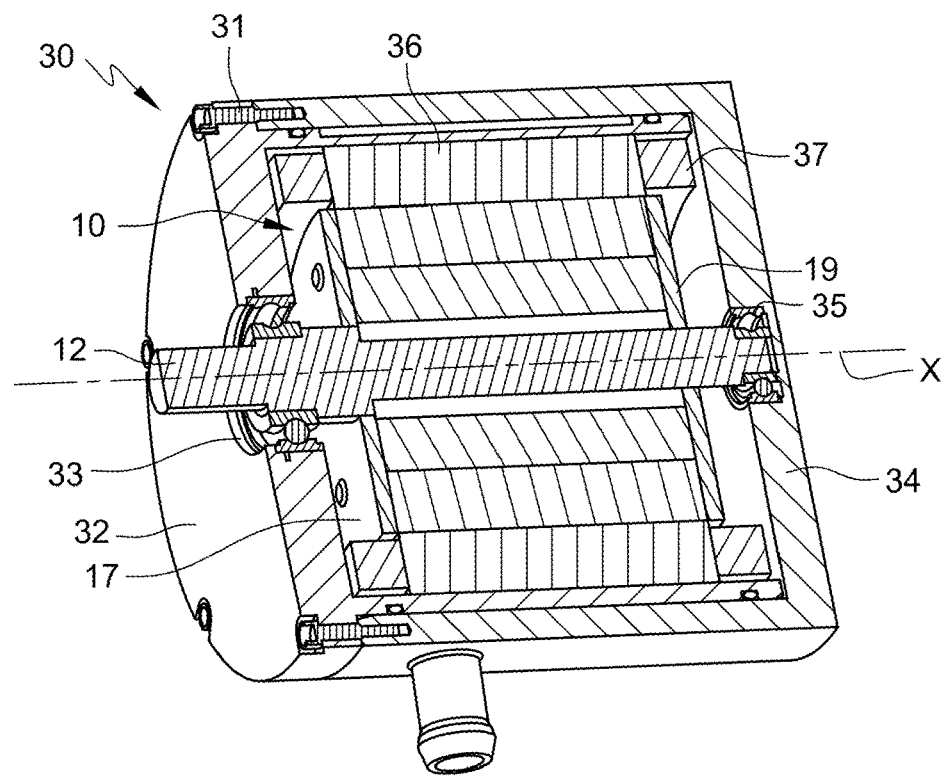
FIG. 1 is a truncated perspective view of an electric motor incorporating a rotor according to a particular embodiment of the disclosure.

Referring to FIG. 1, an electric motor 30 implementing a rotor 10 according to the disclosure is shown. This electric motor 30 comprises in particular a two-piece casing housing the rotor 10 secured in rotation to a shaft 12 rotatably mounted about an axis X and an annular stator 36 which surrounds the rotor 10 coaxially with the shaft 12. The casing consists in particular of a front bearing 32 and a rear bearing 34 which are connected to one another by means of fastening screws 31. The bearings 32, 34 are hollow in shape and each centrally carry a ball bearing 33 and 35 respectively for the rotational mounting of the shaft 32. As illustrated in FIG. 1, winding heads 37 axially project on either side from the stator body 36 and are housed in the intermediate space separating the stator 36 from the respective bearings 32, 3.

Figure 2:
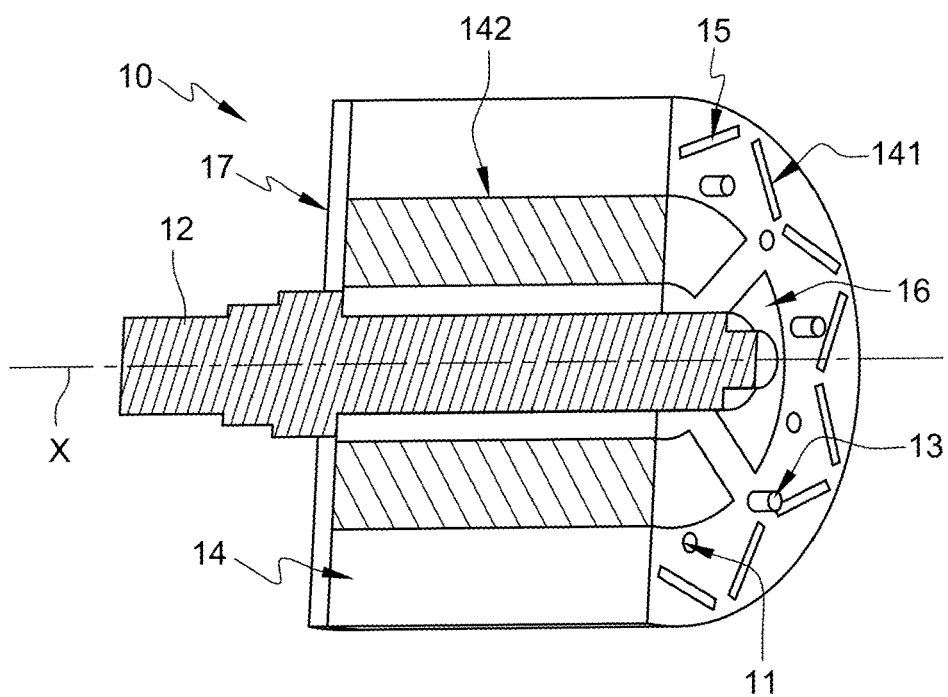
FIG. 2 is an enlarged view of the rotor shown in FIG. 1, the rear balancing flange not being shown.
Figure 3:
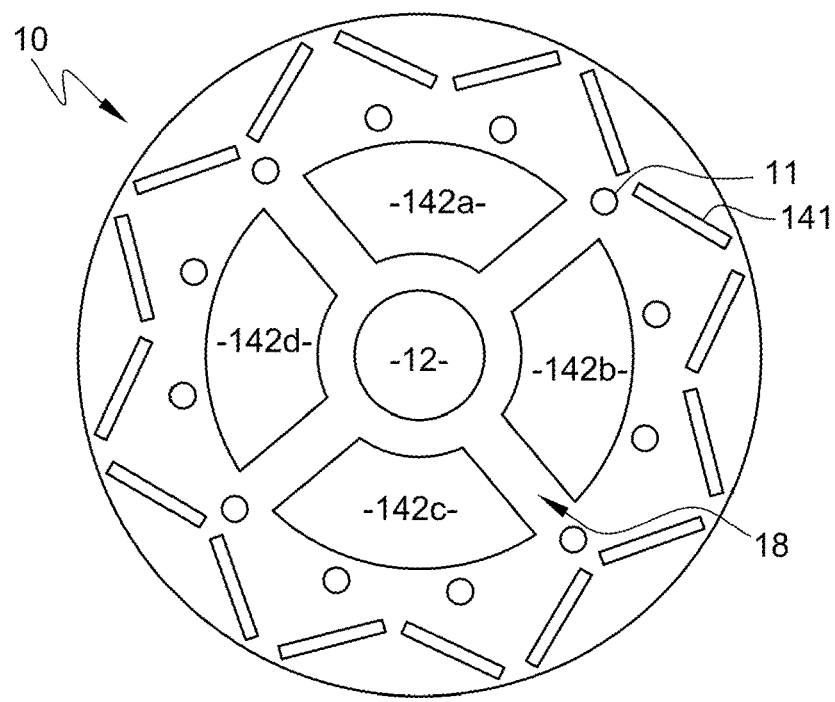
FIG. 3 is a rear axial view of the rotor of FIG. 2.

As shown in FIGS. 2 and 3, the rotor 10 comprises a substantially cylindrical body formed by a lamination stack 14 made of a ferromagnetic material, in particular steel, as well as a plurality of permanent magnets 15 intended to be housed in a plurality of first internal cavities 141 formed inside the lamination stack 14 and disposed obliquely to each other, each of the first internal cavities 141 housing a single permanent magnet 15. The magnets 15 may consist for example of rare earth. In the shown embodiment, the magnets 15 have the shape of a parallelepiped with a rectangular section and are axially disposed about the shaft 12. The magnets 15 are uniformly distributed along the external peripheral edge of the rotor body and are disposed so as to form a multi-arm star pattern. The lamination stack 14 is coaxially mounted on the shaft 12. The shaft 12 may be fitted by force inside a central opening of the lamination stack 14 so as to link in rotation the body of the rotor with the shaft 12.

The lamination stack 14 is formed by an axial pile of laminations which extend in a radial plane perpendicular to the axis X of the shaft 12. A plurality of fastening holes 11 are made in the lamination stack 14 to allow the passage of bolts 13 for fastening the laminations of the stack. These fastening holes 11 are through holes so that it is possible to push a bolt 13 inside each hole 11. A first end of the bolts 13 bears against the external face of a front end flange 17, while the other end of the bolts bears against the external face of a rear end flange 19 (shown in FIG. 1). Thus, the lamination stack 14 is axially clamped between the front end flange 17 and the rear end flange 19. These flanges 17, 19 make it possible to ensure a balancing of the rotor 10 while allowing a good maintenance of the magnets 15 inside the first internal cavities 141. The balancing of these flanges can be carried out by adding or removing material. The removal of material can be carried out by machining, while the addition of material can be carried out by implanting elements in openings provided for this purpose and distributed along the circumference of the flanges 17, 19.

Figure 4:
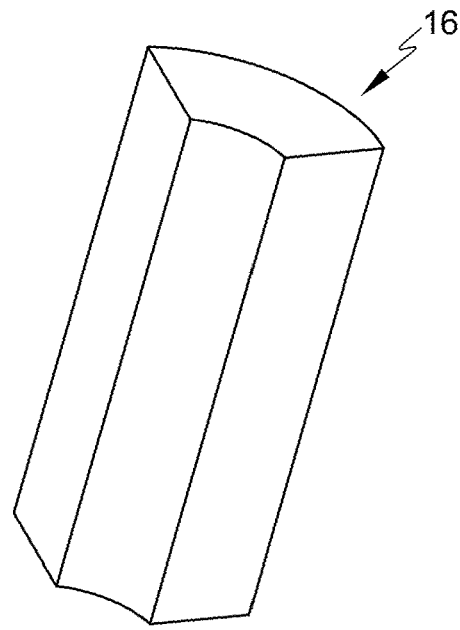
FIG. 4 is a perspective view of a sound absorption element that may be housed inside the rotor of FIG. 2.
Figure 5:
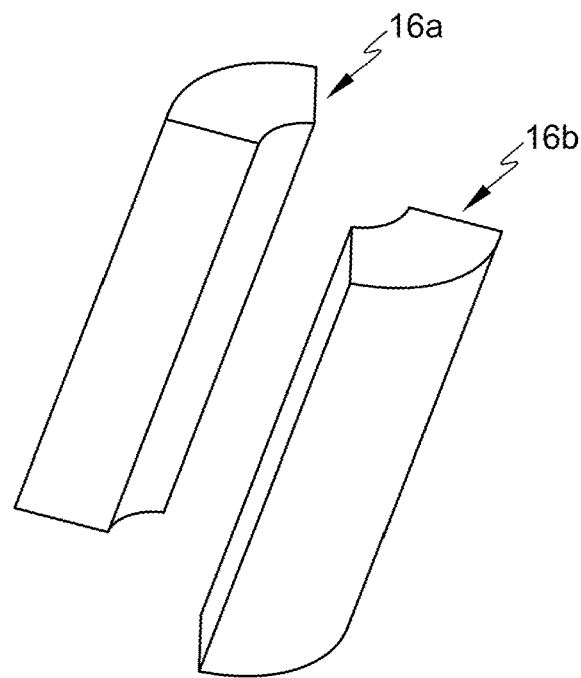
FIG. 5 is a perspective view of a set of two sound absorption elements that may be housed inside the rotor of FIG. 2.
Figure 6:
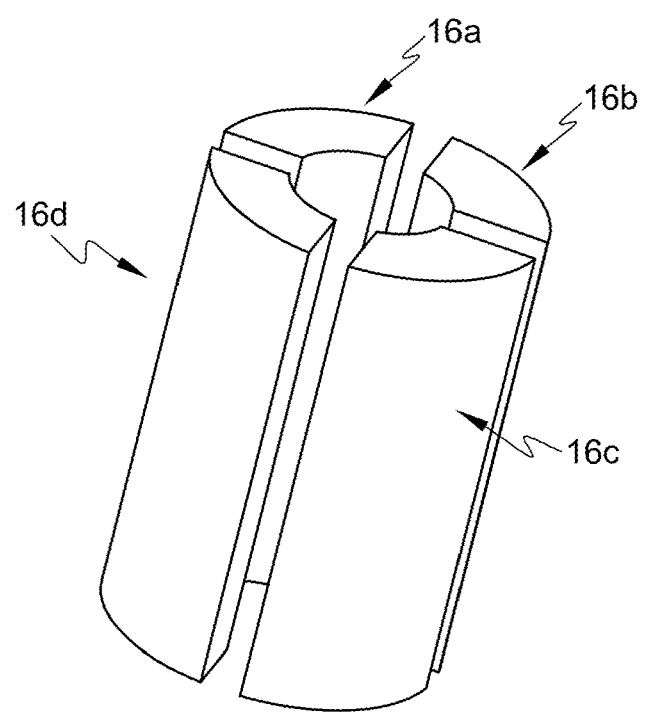
FIG. 6 is a perspective view of a set of four sound absorption elements that may be housed inside the rotor of FIG. 2.

As illustrated in FIG. 3, which is a rear axial view of the rotor of FIG. 2 in which the fastening bolts 13 have not been shown, the lamination stack 14 moreover comprises a plurality of second internal cavities 142 extending along a radial direction with respect to the axis X and which are axially through. In the shown embodiment, the number of these second internal cavities 142 is four, namely the cavities 142a, 142b, 142c and 142d. The cavities 142a-142d each have a ring portion-shaped section and are uniformly distributed about the axis X. Two directly adjacent cavities 142a-142d are separated by a radial segment 18 of the lamination stack 14 so that a central annular portion of the body of the rotor consists of alternating second internal cavities 142a-142d and radial segments 18. Each cavity 142a-142d is configured to house a single sound absorption element 16, shown in FIG. 4. The sound absorption element 16 will advantageously have a shape complementary to that of the cavities 142a-142d. It will moreover have specific properties making it adapted to attenuate the vibrations and/or the noises. To this end, it may consist of a material selected from a silicone material, a mineral polyurethane, a polyurethane-based foam, and a polyamide-based foam. In the example embodiment of FIG. 5, two substantially identical sound absorption elements 16a and 16c may be disposed respectively in the cavities 142a and 142c which are symmetrical with respect to the axis X so as to guarantee a good balancing of the rotor 10, the cavities 142b and 142d in this case being empty. In case the noise level to be attenuated would exceed the sound absorption capacity of the pair of sound absorption elements 16a, 16c, consideration could be given, in another variant, to using two additional sound absorption elements 16b and 16d, as shown in FIG. 6, which may be disposed respectively in the cavities 142b and 142d. In this case, all the internal cavities 142a-142d would be occupied by the sound absorption elements 16a-16d. In another configuration (not shown) of the disclosure, the lamination stack 14 may comprise three, or a multiple of three, second internal cavities 142, said second internal cavities 142 being capable of housing three sound absorption elements 16, said sound absorption elements 16 being disposed symmetrically about the axis X. In particular, the centers of gravity of said sound absorption elements 16 may advantageously form an equilateral triangle in a plane orthogonal to the axis X of the shaft 12.

In all the above-mentioned configurations, each sound absorption element 16 is positioned symmetrically about the axis X and with respect to the other sound absorption elements in order not to create unbalance for the rotor.

In one possible embodiment, each sound absorption element 16 is an independent part which is housed in the internal cavities 142 of the lamination stack 14 prior to the assembly of the front and rear flanges 17, 19. Once screwed together, the front, rear flanges 17, 19 are axially disposed on either side of the lamination stack 14. The sound absorption elements 16 which are flush with the opposite axial ends of the lamination stack 14 are thus held in position on each side by said front and rear flanges 17, 19.

Figure 7:
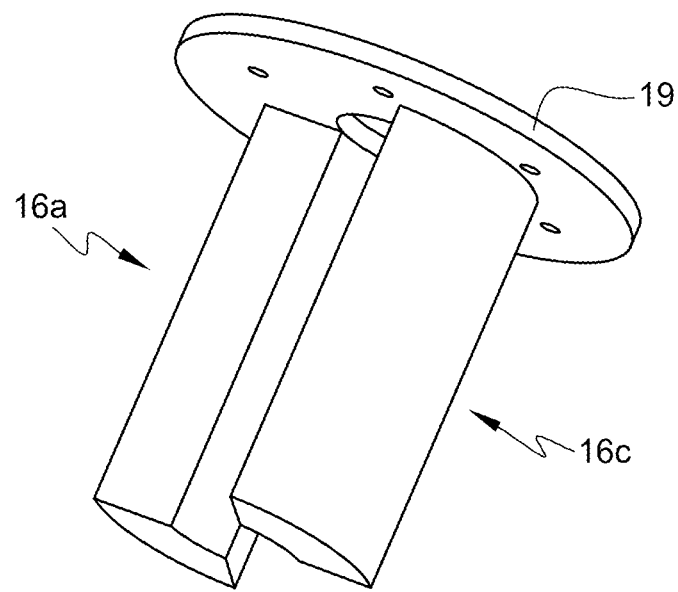
FIG. 7 is a perspective view of a one-piece assembly formed by two sound absorption elements and a rear flange.
Figure 8:
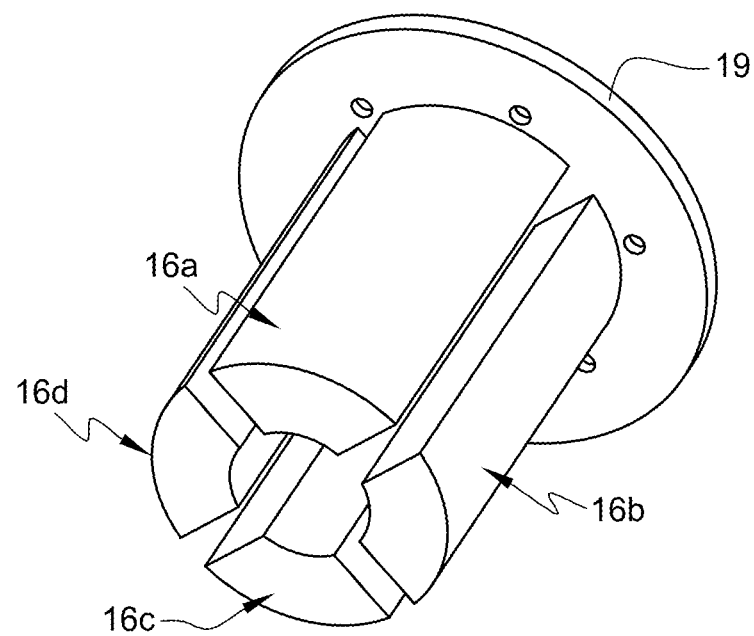
FIG. 8 is a perspective view of a one-piece assembly formed by four sound absorption elements and a rear flange.

In another possible embodiment, shown in FIGS. 7 and 8, each sound absorption element 16 is first over-molded, or welded, or glued, or clipped to one of the front or rear flanges 17, 19 before being introduced into one of the internal cavities 142 of the lamination stack 14, the front and rear flanges 17, 19 being subsequently fastened to each other by screwing. The one-piece assembly shown in FIG. 7, which is formed by the rear flange 19 incorporating the sound absorption elements 16a, 16c, thus corresponds to the embodiment of FIG. 5. The one-piece assembly shown in FIG. 8, which is formed by the flange 19 incorporating the sound absorption elements 16a to 16d, corresponds, in turn, to the embodiment of FIG. 6.

The invention claimed is:

1. A rotor for an electric motor comprising:
    a rotor shaft rotatably mounted about an axis;
    a lamination stack coaxially mounted on the rotor shaft, said lamination stack comprising a plurality of first internal cavities and second internal cavities;
    a plurality of permanent magnets housed inside the first internal cavities of the lamination stack; and
    a front flange and a rear flange coaxially mounted on the rotor shaft and axially arranged on either side of the lamination stack;
    wherein at least two of the second internal cavities each house at least one sound absorption element, said at least one sound absorption element being adapted to attenuate the vibrations and/or the mechanical and/or magnetic noises generated by the rotor during its operation within the electric motor,
    wherein the or each sound absorption element is secured to one of the front or rear flanges, said sound absorption element may be over-molded, or welded, or glued, or clipped to said front or rear flange,
    wherein each second internal cavity is axially through, and
    wherein the or each sound absorption element has a shape complementary to that of the second internal cavity in which the or each sound absorption element is housed.

2. The rotor according to claim 1, wherein said at least two second internal cavities are disposed symmetrically with respect to the axis.

3. The rotor according to claim 1, wherein at least four second internal cavities each house at least one sound absorption element, said at least four second internal cavities being regularly spaced about the axis.

4. The rotor according to claim 1, wherein all of the second internal cavities each house at least one sound absorption element.

5. The rotor according to claim 1, wherein the or each sound absorption element includes a material selected from the group consisting of a silicone material, a mineral polyurethane, a polyurethane-based foam, and a polyamide-based foam.

6. The rotor according to claim 1, wherein each second internal cavity has a ring portion-shaped section.

7. The rotor according to claim 1, wherein each second internal cavity has a triangular or rectangular-shaped section.

8. The rotor according to claim 1, wherein the or each sound absorption element is independent of the front and rear flanges and is held in position on each side by said front and rear flanges when said front and rear flanges are assembled to one another.

9. An electric motor comprising a rotor according to claim 1.

* * * * *